United States Patent [19]
> Workman

[11] 4,268,772
[45] May 19, 1981

[54] LAMINATED ROTOR WITH CAST END WINDINGS

[75] Inventor: John Workman, Greyabbey, Northern Ireland

[73] Assignee: S.B.W. Engineers Limited, Belfast, Northern Ireland

[21] Appl. No.: 70,657

[22] Filed: Aug. 28, 1979

Related U.S. Application Data

[62] Division of Ser. No. 851,268, Nov. 14, 1977, Pat. No. 4,204,314.

[51] Int. Cl.³ .............................................. H02K 17/16
[52] U.S. Cl. ..................................... 310/197; 310/211; 310/216; 310/262
[58] Field of Search ................ 310/179, 195, 197, 198, 310/201, 203, 206, 207, 208, 211, 212, 216, 217, 261, 262, 264, 265

[56] References Cited

U.S. PATENT DOCUMENTS

| | | | |
|---|---|---|---|
| 1,538,196 | 5/1925 | Livingston | 310/216 X |
| 1,610,506 | 12/1926 | Fletcher | 310/212 X |
| 2,528,960 | 11/1950 | Klima | 310/211 X |
| 3,761,752 | 9/1973 | Anderson | 310/179 |
| 3,987,324 | 10/1976 | Linkous | 310/211 X |

FOREIGN PATENT DOCUMENTS

| | | | |
|---|---|---|---|
| 590949 | of 0000 | Fed. Rep. of Germany . | |
| 1405924 | 6/1965 | France . | |
| 561658 | of 0000 | United Kingdom | 310/212 |

*Primary Examiner*—Mark O. Budd
*Attorney, Agent, or Firm*—Finnegan, Henderson, Farabow, Garrett & Dunner

[57] ABSTRACT

A laminated electromagnetic core incorporates a double layer winding with the core being formed from first and second sets of apertured laminations of which one set accommodates the conductors of one layer of the winding and the other set accommodates the conductors of the other layer of the winding the conductors being interconnected by end windings and adjacent laminations in each lamination set are displaced from mutual alignment to permit the conductor end windings to be of minimal length such that conductor ends which are to be interconnected adjoin one another, the end windings being formed as in situ castings.

8 Claims, 13 Drawing Figures

Fig. 1.
Fig. 2.
Fig. 3.
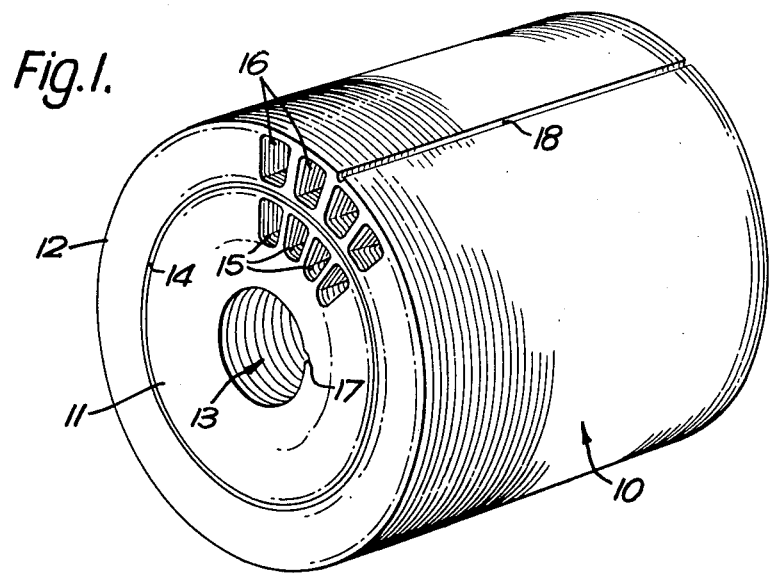
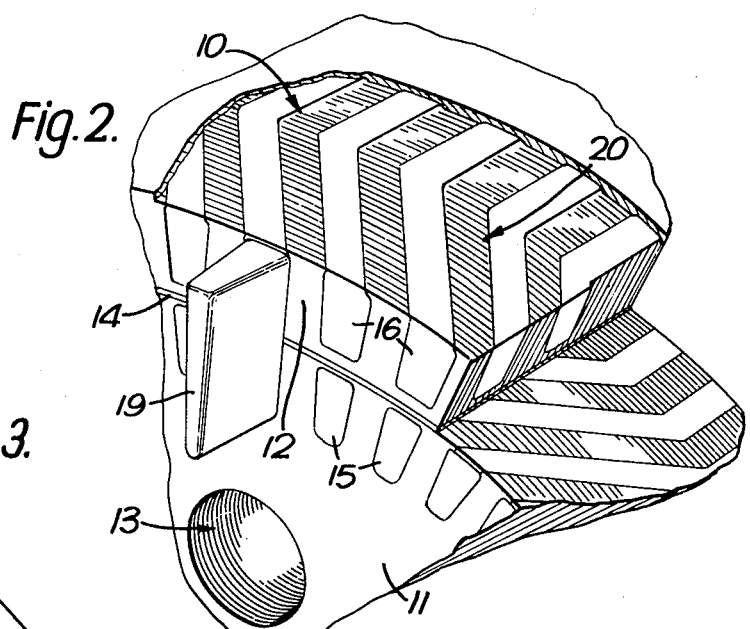
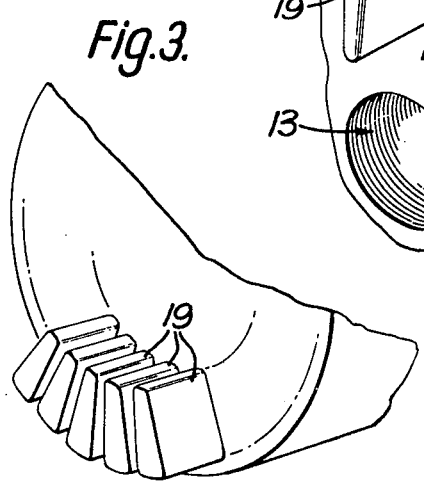

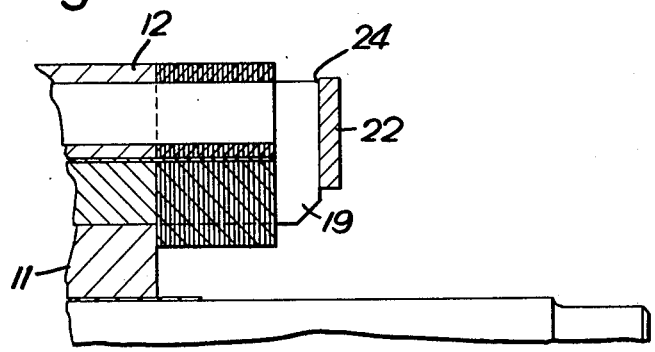
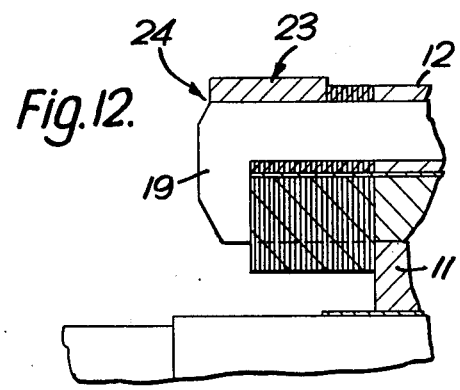
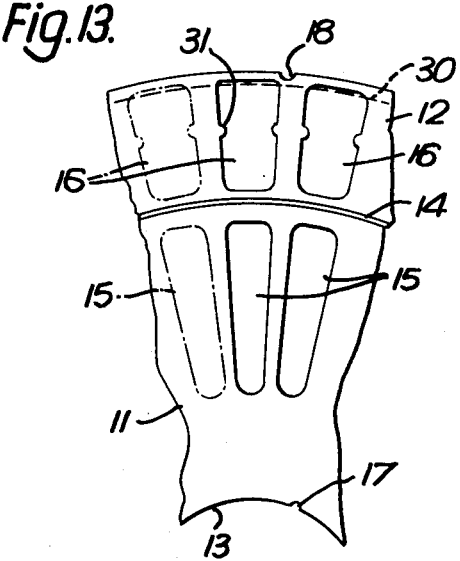

LAMINATED ROTOR WITH CAST END WINDINGS

CROSS-REFERENCE TO RELATED APPLICATION

This application is a Division of my application Ser. No. 851,268 filed Nov. 14, 1977, now U.S. Pat. No. 4,204,314, issued May 27, 1980.

BACKGROUND OF THE INVENTION

This invention relates to electromagnetic devices, such as stators for electric motors.

Hitherto in the manufacture of certain electromagnetic devices the electrical winding has had its conductors located in the electromagnetic core itself and the conductors have been interconnected by end windings located at the end faces of the core. Because of the desired sequence of connecting the conductors the end windings have been relatively complicated in construction and layout, extending circumferentially through many radians. Attempts have been made in the past to simplify the end winding construction and as illustrated in German Pat. No. 590949 a single layer winding is shown with the end windings formed as arcuate strips interconnecting substantially radially-extending leaders connected to the conductors. This arrangement is limited in its application to a single layer low-voltage 3 phase A.C. winding and the number of conductors in the core is limited in relation to the end windings which can only be accommodated successfully in groups.

In another prior proposal, known from French Pat. No. 1405924 the end windings are arcuate elements spanning a plurality of core slots and the winding is formed in two layers each layer being electrically separate from the other.

In a further prior proposal, known from U.S. Pat. No. 3,761,752 the conductors of the winding are helically disposed on a support structure and the end windings interconnect adjacent conductors in the winding layer.

SUMMARY OF THE INVENTION

It is an object of the present invention to provide an electromagnetic device which simplifies the formation of the end windings and permits maximum flexibility in formation of the winding. This object is achieved in accordance with the present invention by the use of a core composed of first and second sets of laminations, by the specific disposition of these laminations, and by the particular form of double-layer winding used.

According to the present invention there is provided an electromagnetic device having a core made of laminated material with a double-layer winding therein, wherein said core is composed of first and second sets of apertured laminations of which one set accommodates the conductors of one layer of said winding and the other set accommodates the conductors of the other layer of said winding, the conductors of said one layer being interconnected with the conductors of said other layer by cast in situ end windings located at the end faces of said core, and wherein each lamination set includes adjacent laminations which are mutually displaced from alignment, the arrangement being such that the end windings interconnect adjoining conductor ends.

DESCRIPTION OF PREFERRED EMBODIMENTS

Embodiments of the present invention will now be described by way of example with reference to the accompanying drawings in which:

FIG. 1 is a perspective view of the centre section of a laminated core in the form of an armature for a D.C. electric motor;

FIG. 2 is a perspective view partly in section of part of one end section of the armature of FIG. 1, the other end section being formed in a similar manner;

FIG. 3 is a perspective view of a detail showing the end windings of the armature of FIG. 2;

FIG. 11 is a sectional view of a detail showing one form of commutator for an armature;

FIG. 12 is a sectional view showing an alternative form of the detail of FIG. 11; and FIG. 13 shows a preferred shape for the lamination apertures of the core.

Figure 4:
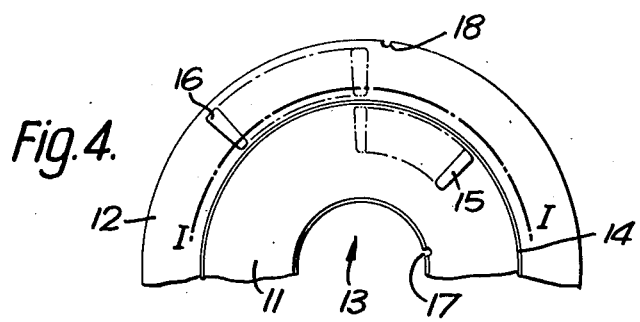
FIG. 4 is a diagrammatic end view of a laminated core which is helpful in understanding alternative conductor arrangements.

An armature for a D.C. electric motor includes a laminated core mounted on a rotor shaft and as shown in FIG. 1 the core has a central section 10 having a length approximately equal to the pole length of the motor. The core is formed from co-axially arranged sets of inner laminations 11 and outer laminations 12, the sets being insulated electrically from each other by a layer of insulating material 14, preferably alumina. Each inner lamination 11, has a central aperture 13 for mounting the inner laminations 11 on the rotor shaft (not shown). The inner and outer laminations 11,12 are therefore annular and are respectively provided with apertures 15, 16 which are circumferentially disposed, the apertures 15, 16 being arranged, as will be described, to form slots for accommodating a double-layer winding when the core is assembled, one layer of the winding being accommodated in the lamination set 11 and the other layer of the winding being accommodated in the lamination set 12.

As shown in FIG. 1 the inner and outer laminations 11, 12 respectively have registration formations in the form of notches 17, 18 to enable correct positioning of the apertures 15, 16 on assembly of the core. In the central section 10 of the core the apertures 15, 16 are mutually aligned and are of approximately equal cross-sectional area.

In FIG. 2, the core end sections 20 (only one of which is shown) are formed from the same type of laminations 11, 12 as shown in FIG. 1. They may however be formed by laminations with larger apertures at 15, 16 than in the central core section 10 since there may be no need to pass magnetic flux through the laminations of the end sections. In the core end section 20 the apertures 15, 16 are displaced from mutual alignment, or skewed in relation to the laminations of the central core section 10 and the laminations 11 are skewed in one circumferential direction whereas the laminations 12 are skewed in the opposite circumferential direction.

The angle of the skew depends upon the type of winding required for the armature and the pole pitch of the stator but, in accordance with the present invention, the skew positions the conductor slots for upper and lower conductors which require to be joined together adjoining one another. Skewing is achieved by guide means engaging the notches 17, 18 and after the laminations 11, 12 are arranged in the required position, they are bonded together in a known manner to form a solid core. Alternatively the laminations may be held in a fixture which may be removed after the conductors are located in the slots. After the laminations are located and the core is bonded together the inner surfaces of the conductor slots formed by the apertures 15, 16 are coated with insulating material and then the conductors are fitted to the slots. Molten aluminium or other conducting metal may be cast into the slots to form the conductors. During the casting process, removable moulds (not shown) are provided at the ends of the core such that the ends of adjacent upper and lower conductors are connected by end windings 19 formed in the removable moulds. Alternatively, suitable material such as copper in solid form may be forced through the conductor slots and the end windings formed thereafter by a casting process as described above. The end windings 19 at one end of the core can be suitable machined thereafter to form a commutator or commutator connection for the D.C. motor. The assembly of the laminated core with its winding is then mounted on its shaft in a known manner and additionally may be insulated from the shaft by a layer of insulation 40 (FIG. 10).

FIG. 3 depicts the end winding arrangement produced by the above described procedure. The end windings 19 may be axially elongated to act as cooling fins for the motor.

Figure 10:
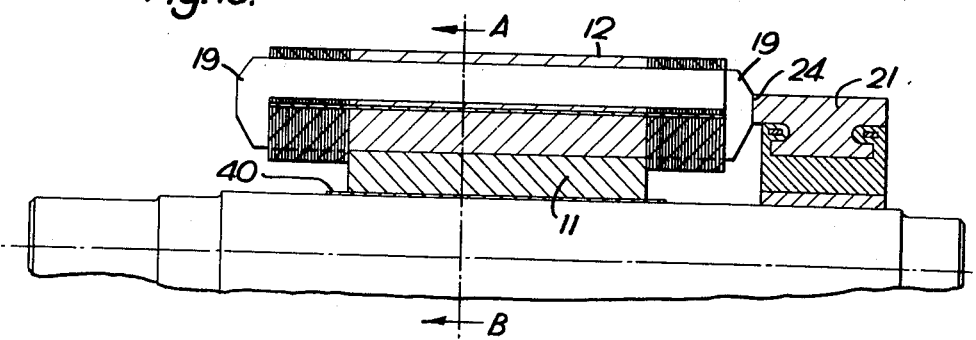
FIG. 10 shows an armature including the laminated core of FIG. 9, the core being shown as a section taken on the line ABCDE of FIG. 9.

FIG. 4 also shows an end view of the laminated core and depicts the apertures 15, 16 in full line in the position occupied at the line A—B in FIG. 10, i.e. in the central section 10 of the core whereas in the end section 20 the apertures are in the position depicted in broken outline, the angular separation of the apertures having been reduced to zero by the above-mentioned lamination skew effect.

Figure 5:
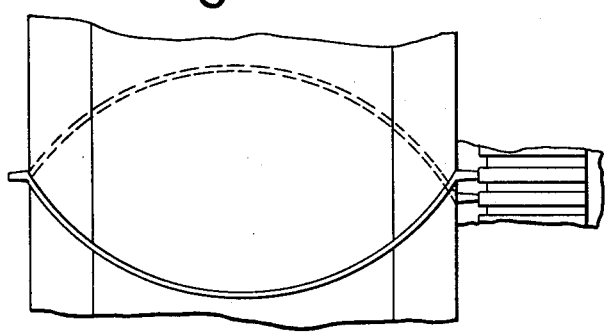
FIG. 5 is a developed view taken on the line I—I in FIG. 4 showing part of a first lap winding.
Figure 7:
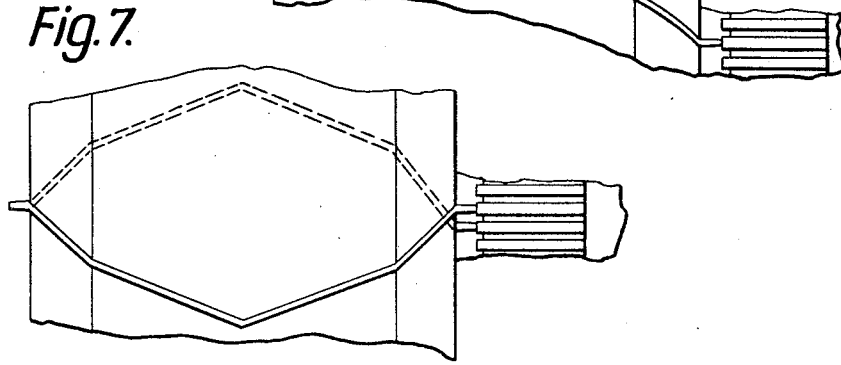
FIG. 7 is a developed view taken on the line I—I of FIG. 4 showing part of a second lap winding.

In FIGS. 5 and 7 the laminations are suitably skewed over the entire length of the core to form slots suitable for lap windings. It will be noted that the right hand end winding shown is connected to a commutator.

Figure 6:
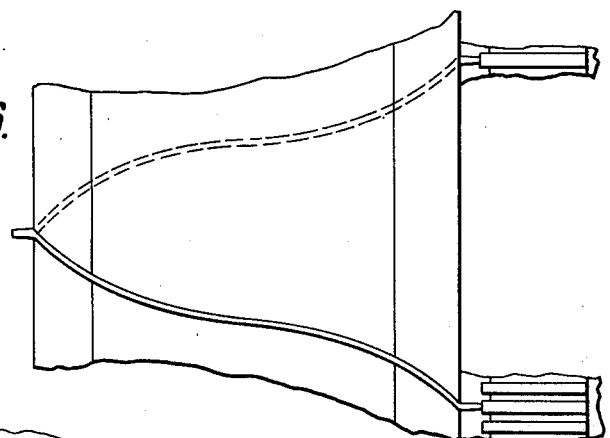
FIG. 6 is a developed view taken on the line I—I in FIG. 4 showing part of a first wave winding.
Figure 8:
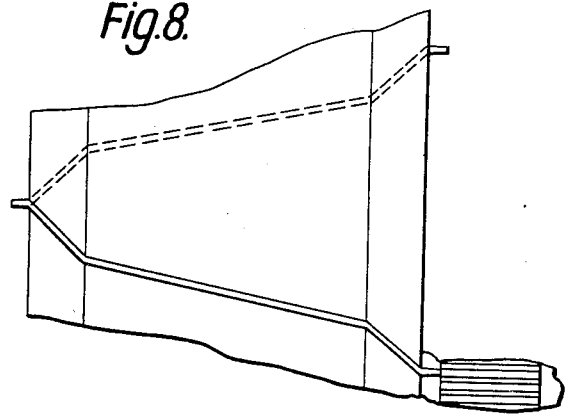
FIG. 8 is a developed view taken on the line I—I in FIG. 4 showing part of a second wave winding.

In FIGS. 6 and 8, the laminations are again skewed over the entire length of the core but in a manner to form slots suitable for wave windings.

Figure 9:
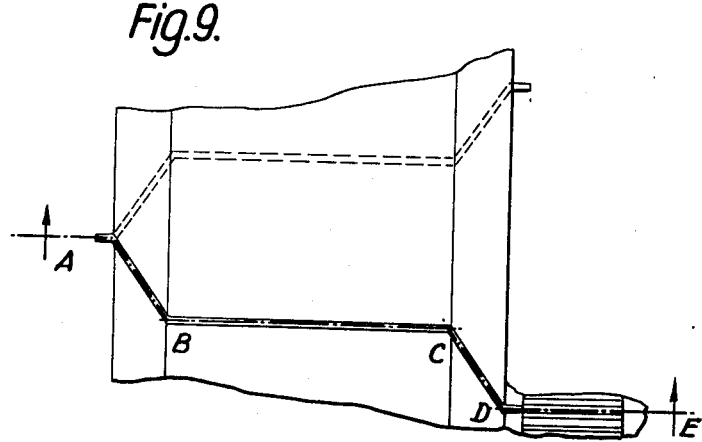
FIG. 9 is a developed view taken on the line I—I in FIG. 4 showing part of a third wave winding.

In FIG. 9, the upper and lower slots in the core center section 10 are parallel and only the core end sections 20 are skewed in a manner to form a wave winding.

In FIG. 10 a conventional commutator 21 is axially connected at 24 to the end windings 19 of the FIG. 9 core.

In FIG. 11, a face type commutator 22 is attached to and supported by the end windings 19 so as to be suitable for brushes bearing axially on the end face.

In FIG. 12, a commutator 23 is attached at the core end section 20 following machining to expose the conductor by removal of part of the lamination structure.

This commutator may therefore have its segments skewed relative to the axis of the armature.

In FIGS. 10, 11 and 12, the commutators are connected to the armature by either physical pressure or other known means such as electron beam welding and the commutators are formed of material other than that of the metal conductor. Also more than one commutator may be attached to the same winding.

In FIG. 13, one shape for the apertures 15 and 16 in the laminations 11 and 12 is shown; the apertures are of substantially equal cross-sectional area but of different cross-sectional shape, the apertures 15 being elongated in the radial direction and mutually separated by substantially constant widths of the lamination material.

It may be advantageous in certain cases to machine a portion of the outer surface of all sections of the armature down to the line 30 in order to improve the armature performance. In such cases, the apertures 16 are profiled to locate the conductors radially therein, and one form of such profiling is the provision of notches 31 shown in FIG. 13.

Casting of the winding may be performed by using centrifugal casting, gravity die casting, pressure die casting, or pore free die casting (which involves filling the moulds with reactive gas such as oxygen, prior to casting).

The core end sections may be formed from laminations made of refractory material in which suitably shaped apertures are formed.

Although cores with windings for lap and wave wound D.C. motors have been described, the invention is equally applicable to lap and wave would cores for D.C. generators, cores for D.C. magnet coils, cores for salient pole synchronous A.C. motors, and cores for slip-ring induction motors. Also, winding may be cast into slots formed in cores which are linear or radial as opposed to cylindrical as described above, thus permitting manufacture of radial or linear motors or generators.

What is claimed is:

1. An electromagnetic device having a core made of laminated material with a double-layer winding therein, wherein said core is composed of first and second sets of apertured laminations of which one set accommodates the conductors of one layer of said winding and the other set accommodates the condutors of the other layer of said winding, the conductors of said one layer being interconnected with the conductors of said other layer by cast in situ end windings located at the end faces of said core, and wherein each lamination set includes adjacent laminations which are mutually displaced from alignment, the arrangement being such that the end windings interconnect adjoining conductor ends.

2. A device as claimed in claim 1, wherein each lamination set includes adjacent laminations which are mutually aligned.

3. A device as claimed in claim 1, wherein a layer of alumina separates the first set of laminations from the second set of laminations.

4. A device as claimed in claim 1, wherein adjacent said end windings the conductor ends of said one layer have the same cross-sectional area as the conductor ends of said other layer but the cross-sectional shape of the conductor ends in said one layer differs from the cross-sectional shape of the conductor ends in said other layer.

5. A device as claimed in claim 1, wherein said core is substantially cylindrical and said laminations are annular, said first and second lamination sets being co-axial.

6. A device as claimed in claim 5, wherein the mutually displaced adjacent laminations of said first lamination set are skewed in one circumferential direction and the mutually displaced adjacent laminations of said second lamination set are skewed in the opposite circumferential direction.

7. A device as claimed in claim 5, wherein the lamination apertures adjacent the core ends are of greater cross-sectional area than the lamination apertures of the intermediate laminations.

8. A device as claimed in claim 5, wherein the apertures of the co-axially inner lamination set are elongated in the radial direction and mutually separated by substantially constant widths of the lamination material.

* * * * *